Feb. 26, 1924.                                              1,485,326
W. F. ADAMS
AUTOMOBILE BUMPER
Filed Aug. 31, 1923
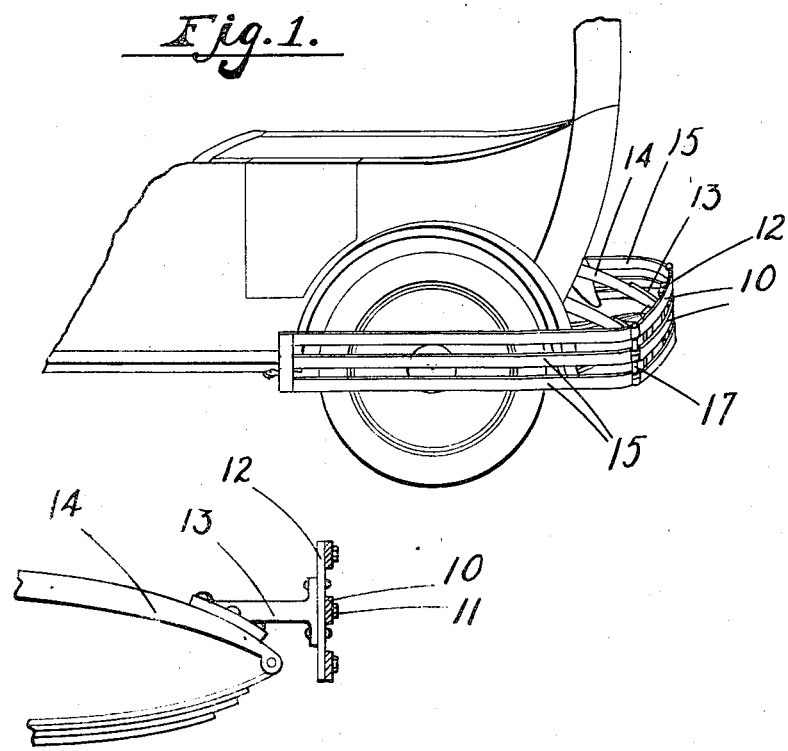
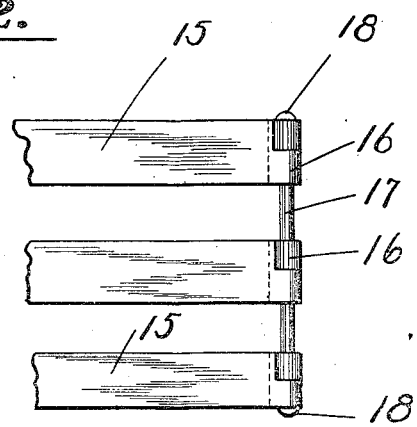
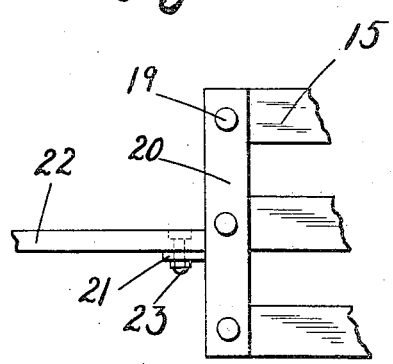
INVENTOR
William F. Adams.
by Hazard and Miller
ATT'YS.

Patented Feb. 26, 1924.

1,485,326

UNITED STATES PATENT OFFICE.

WILLIAM F. ADAMS, OF SANTA MONICA, CALIFORNIA.

AUTOMOBILE BUMPER.

Application filed August 31, 1923. Serial No. 660,380.

*To all whom it may concern:*

Be it known that I, WILLIAM F. ADAMS, a citizen of the United States, residing at Santa Monica, in the county of Los Angeles and State of California, have invented new and useful Improvements in Automobile Bumpers, of which the following is a specification.

This invention relates to improvements in automobile bumpers. An object is to provide a rear bumper with side members extending to the running board of the automobile which serves to protect the rear fenders and wheels. With the foregoing and other objects in view, this invention consists of the features of construction and combination and arrangement of parts hereinafter more fully described and claimed, reference being made to the accompanying drawings in which, Fig. 1 is a partial perspective of an automobile on which the bumper is mounted.

Fig. 2 is a view in side elevation showing a means of mounting the bumper upon the spring bracket.

Fig. 3 is a side elevation showing a means for hingedly fastening the side members to the transverse bumper.

Fig. 4 is a side elevation showing a means for fastening the side members to the running board.

Referring to the drawings in which similar reference characters designate similar parts, my invention comprises a rear bumper for an automobile having transverse members 10 fastened as by suitable tap screws 11 to an upright 12 which may be integral with, but is illustrated as fastened to a bracket 13 mounted upon the spring bracket 14. Side members 15 are hingedly connected to the transverse members 10 by any suitable means, such as providing lapping projections 16 having drilled holes through which is passed a pin 17 provided with end heads 18.

The opposite ends of the side members 15 are fastened as by rivets 19 to an upright 20 which is provided with a lug 21 extending beneath the running board 22 and locked by any suitable means as by a bolt 23 countersunk in and passing through the running board.

The hinge connection of the side members enables them to be swung out upon changing a tire or removing a wheel. It is seen that this type of a bumper in no way interferes with a gasoline tank, tire carrier or trunk, being mounted upon the rear of the automobile. The transverse members and the side members both being fastened to parts rigidly mounted upon the frame of the automobile will not move relatively to each other upon striking a rut.

When it is desirable to place this bumper upon an automobile having a different spring construction from that herein shown, the brackets 13 may be replaced by longer brackets and fastened directly to the frame.

Although the bumper herein described is made up of three bars joining the transverse and side members, it will be understood that a single bar or any other plurality of bars may be used.

I claim:

A bumper for automobiles including transverse guard means rigidly attachable to a part of the automobile and side guard means attached to the transverse guard means and adapted to be readily adjusted to permit the removal and application of the automobile wheels.

In testimony whereof I have signed my name to this specification.

WILLIAM F. ADAMS.